United States Patent
Jahanghir

[11] Patent Number: 6,020,924
[45] Date of Patent: Feb. 1, 2000

[54] REDUCED MEMORY SIZE SET TOP BOX WHICH STORES FRAMES AND ASSOCIATED MOTION VECTORS WHICH INDICATE WHICH BLOCK OR BLOCKS ARE TO BE RETRIEVED FROM MEMORY

[75] Inventor: Musa Jahanghir, Hayward, Calif.

[73] Assignee: Samsung Electronics Co., Ltd., Suwon, Rep. of Korea

[21] Appl. No.: 08/631,105

[22] Filed: Apr. 12, 1996

[51] Int. Cl.[7] .............................. H04N 7/12; H04N 11/02; H04N 11/04

[52] U.S. Cl. ............................ 348/416; 348/402; 348/413

[58] Field of Search .................................. 348/416, 415, 348/402, 407, 413

[56] References Cited

U.S. PATENT DOCUMENTS

| | | |
|---|---|---|
| 5,198,901 | 3/1993 | Lynch . |
| 5,293,229 | 3/1994 | Iu . |
| 5,311,310 | 5/1994 | Jozawa et al. . |
| 5,361,105 | 11/1994 | Iu . |
| 5,379,356 | 1/1995 | Purcell et al. .............................. 382/56 |
| 5,386,234 | 1/1995 | Veltman et al. . |
| 5,400,076 | 3/1995 | Iwamura . |
| 5,576,765 | 11/1996 | Cheney et al. ........................... 348/407 |

*Primary Examiner*—Douglas W. Olms
*Assistant Examiner*—David R Vincent
*Attorney, Agent, or Firm*—Kenneth L. Sherman, Esq.; Sherman & Sherman

[57] ABSTRACT

A real time decoder converts received compressed digital video signals to television luma and chroma format for current display. Incoming signals are error checked and corrected and directly stored in compressed format in a memory under control of a digital signal processor. For each video frame to be currently displayed, a current data block is identified and stored in a current block buffer. Data blocks from a previous frame are identified from motion vector data of the current block and accessed from memory to be temporarily stored in one or more buffers. Inverse discrete cosine transformation decodes the data blocks, the resulting data being added to difference data in the current data block, the resulting data fed to a post processor for output as television format signals.

14 Claims, 5 Drawing Sheets

REDUCED MEMORY SIZE SET TOP BOX WHICH STORES FRAMES AND ASSOCIATED MOTION VECTORS WHICH INDICATE WHICH BLOCK OR BLOCKS ARE TO BE RETRIEVED FROM MEMORY

TECHNICAL FIELD

The present invention relates to digital video signal processing and more particularly to a television set top box having a reduced memory size.

BACKGROUND ART

The term "set top box" generally signifies a unit that serves to deliver compressed digital video and audio signals in real time usable form to one or more television receivers. The unit may comprise an Application Specific Integrated Circuit (ASIC), which performs decoding and processing functions, and a memory for storing video signal information. The compressed signals may be received over cable from a cable TV source or from any telecommunications source including, for example, satellite broadcast. Various conventional formats have been contemplated for compressed video signals, the standards currently favored being set forth by the Motion Picture Experts Group (MPEG).

The need for effective compression techniques arises from the large amount of information inherent in video picture frames and the high rate at which such information changes in motion picture presentation. Management of such information must meet the capabilities of recording media, such as an optical disc, to perform a high rate of recording and reproduction with acceptable quality, as well as the challenge of real time transmission of video signals.

MPEG is a bi-directional predictive coding compression standard, coded in accordance with discrete cosine transformation (DCT) processing. Picture elements are converted from spacial information into frequency domain information to be processed. Various processing schemes have been developed to implement the MPEG standard. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat. No. 5,400,076 to Iwamura of Mar. 21, 1995. Those disclosures and citations referenced therein may be consulted for an understanding of the specific details of conventional MPEG compression and decompression arrangements.

MPEG processes video data in groups of sequential frames. An intra-coded frame, or I frame, is encoded using only pixels within an actual original video frame, i.e., independently of other frames, and serves as a reference frame to derive compressed data for other encoded frames in advance of or following the I frame in the encoded frame sequence. The number of actual video frames to be coded into such I frames is set in the MPEG syntax, e.g., one reference frame for each fifteen frames, or every half second. Interspersed among successive I frames are frames generally of increased compression. A prediction is made of the composition of a video frame to formulate a prediction frame, termed a P frame, to be located a specific number of frames following or in advance of the next reference frame, the specific number also set in the MPEG syntax. Information from previous frames as well as later frames may be used in formulating the prediction. A P frame may be encoded from I frame information by partitioning the P frame into blocks of pixels, or motion blocks. A matching block is sought in the I frame for each motion block of the P frame. Motion vectors are used to indicate the displacement in the x and y directions between the matched blocks in the two frames. A P frame, as well as an I frame, may serve as matching block reference information for deriving another P frame. Differences between the motion blocks and the matched blocks are also encoded. P frames are thus represented by less data, and are thus more compressed, than the encoded I frames.

"Delta" information is developed for coding frames, called B frames, between the actual (I) and predicted (P) frames, and between (P) frames also by looking at frames in both directions. Rather than updating a whole frame, only the changed (or delta) information is provided for the delta frames. Thus the total information coded, and then transmitted, is considerably less than required to supply the actual information in the total number of frames.

As illustrated by the above identified patents, various schemes have been developed to carry out MPEG coding and decoding. Transmitted MPEG data generally includes I frame data, motion vector information for P frames and B frames, difference or residue data for predictive coding, and data indicative of a particular coding scheme used.

On decompression, the decoder in sequence uses the reference frames to form the prediction frames, which frames also may be used to construct the delta frames. Data is thus often decoded in an order different from the order in which frames are viewed. Decoding must be several frames ahead of the frame currently shown on video. For proper picture resolution and quality, conventional set top boxes store temporarily at least two frames of image information while an image is built for display on the television screen. The frame signals are received in compressed form, expanded by the decoder chip, and stored in memory. The expanded frame information is then used to derive display image information.

FIG. 1 is a block diagram of an exemplary prior art MPEG decoder that may be used in a set top box. Encoded signals of blocks of a video frame are received successively at the input terminal and buffered at buffer 11. The received signals comprise picture signal data and motion vector data, the latter data being prevalent in B frame and P frame signals. I frame data and P frame data serve as reference block data for the motion vectors contained in other B frame and P frame signals.

A portion of a display frame is illustrated in FIG. 2A, wherein a display object is positioned in a block at the lower left area. FIG. 2B illustrates a portion of a later display frame wherein the object has moved to another position in the display frame displaced in the x and y directions from the location in the frame of FIG. 2A. The original object may have changed somewhat, such as in dimension, shape color, etc., or have remained substantially unchanged. As shown, the object in the later frame occupies portions of four blocks. Video signals for the frame of FIG. 2B are coded with motion vector data indicating location displacement of blocks from the reference frame position as well as difference data that represent changes in picture content.

Blocks of video signal data from the buffer are fed successively to demultiplexer 13, which separates motion vector information from picture signal components. The resulting picture signal is fed to variable length decoder 15, which decodes each block to provide quantized transform coefficients. This block data is then fed successively to inverse quantizer 17 and inverse discrete cosine transform circuit 19 whereby block picture information is recovered.

The motion vector data for the current block is fed from demultiplexer 13 to motion vector calculating circuit 21. The motion vector calculating circuit receives a reference block of picture data from frame memory 23 and provides compensation in accordance with motion vector data for the current block received from the demultiplexer. The resulting block picture data is combined with the picture information recovered from discrete cosine transform circuit 19 at adder 25. The reconstructed picture block thus obtained is stored as a new block in frame memory 23. Frame memory 23 is RAM storage. Frame selector circuit 27 controls arrangement of delivery of the decoded frames, all stored blocks correlated therewith, in the proper order. Reference is made to the Iwamura and Veltman et al. patents, identified previously, for further description of this prior art decoding scheme.

As the frame memory stores decoded blocks of picture information, a large amount of RAM is needed to deliver acceptable picture resolution and quality. Such a large memory requirement makes the set top box expensive. In addition, the frame memory data storage arrangement does not take advantage of the efficiencies of the MPEG block encoding scheme of the received video signals. Such efficiencies would enable higher quality video delivery, such as in HDTV applications, and reduce the cost of the set top box unit such that it would be feasible to build its functions into the television receiver.

DISCLOSURE OF THE INVENTION

The foregoing drawbacks in the described prior art schemes are overcome by the present invention by reducing the frame memory size requirements for the set top box MPEG encoder. Rather than decode each information block in accordance with its associated motion vector when received, the video input signals are stored in memory in their compressed form as received at the decoder input. The motion vector information and block pointers are stored so that the appropriate block data can be decompressed when needed for display. Considerably less memory storage is used by the present invention than is required for storing the decompressed video information.

BEST MODE FOR CARRYING OUT THE INVENTION

Figure 3:
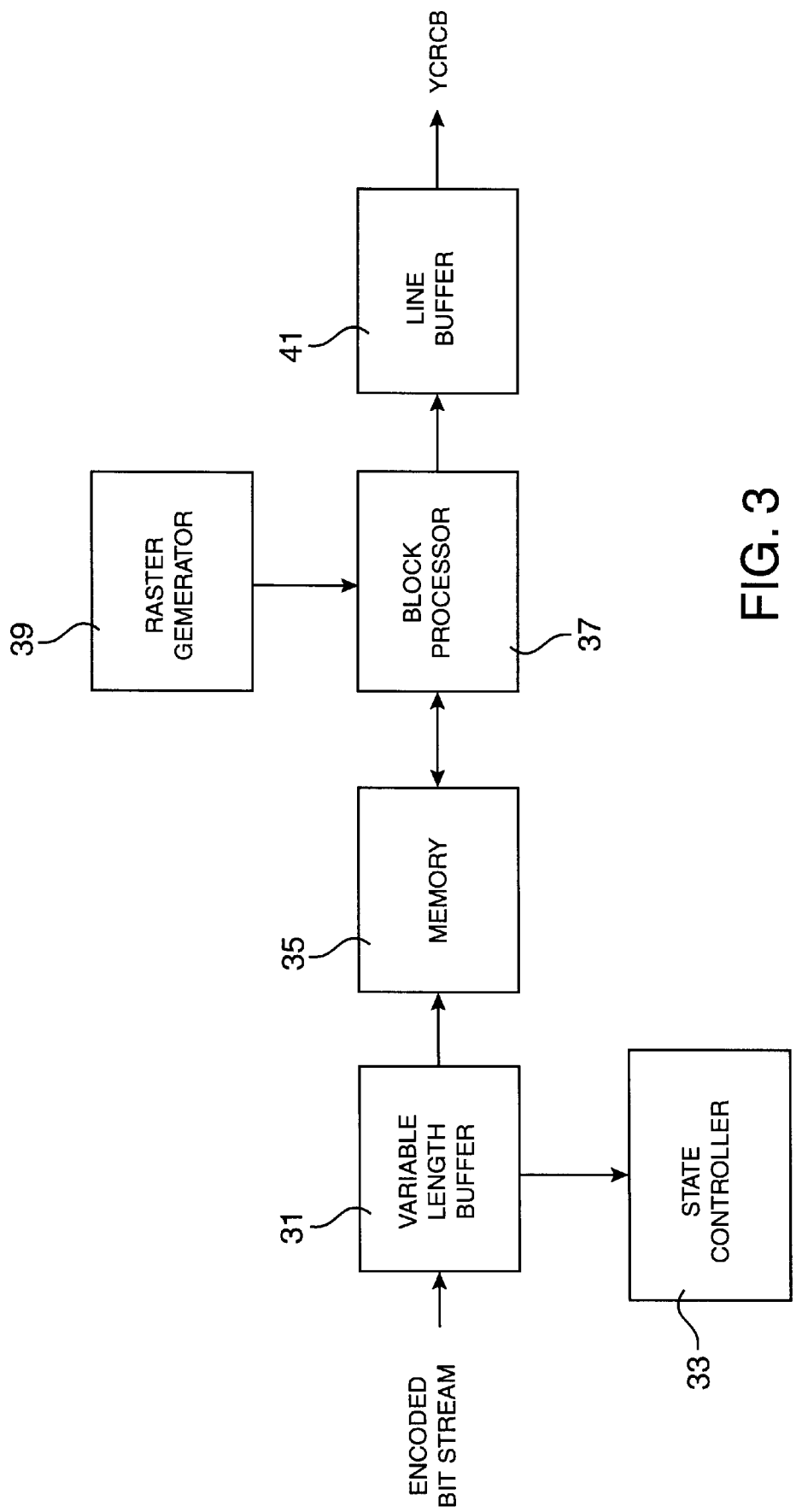
FIG. 3 is a block diagram of a decoder in accordance with the present invention.

FIG. 3 is a block diagram of a decoder in accordance with the present invention that may be located in a set top box or made part of a television receiver. The incoming coded bit stream is received in series of blocks by variable length buffer 31, which strips sequence control information from frame headers. Such information would include, for example, identification of the beginning of a new slice, frame, or picture. Sequence control information is directed to state controller 33 for controlling the overall sequence of operations of the chip. The remainder of the received bit stream data is directly written in memory 35. In this manner, I frame, B frame and P frame data is stored in memory in compressed form. A motion vector, included in the received bit stream data and representing block displacement information, is stored in memory for each block.

At a later time, when the frame that includes stored block information is to be reconstructed and displayed, the information is retrieved from memory and decompressed in block processor 37, filtered line by line, and applied to line buffer 41. The line buffer outputs television picture information in luma and chroma format, depicted as YCRCB, where Y represents luma, CR represents chroma red and CB represents chroma blue.

The block processor 37 receives horizontal position and vertical line number data, continuously generated by the raster generator 39. For each block, horizontal pixel positions are identified successively for each line, the process being repeated line by line until all pixels of the block have been represented. The next block would initiate an identification of the first horizontal pixel in the first vertical line and the entire block raster generation process repeated. In a sixteen by sixteen pixel block, for example, the block processor would recognize a new block after the sixteenth pixel of the sixteenth line. A new block must then appropriately be reconstructed from data stored in memory.

Figure 1:
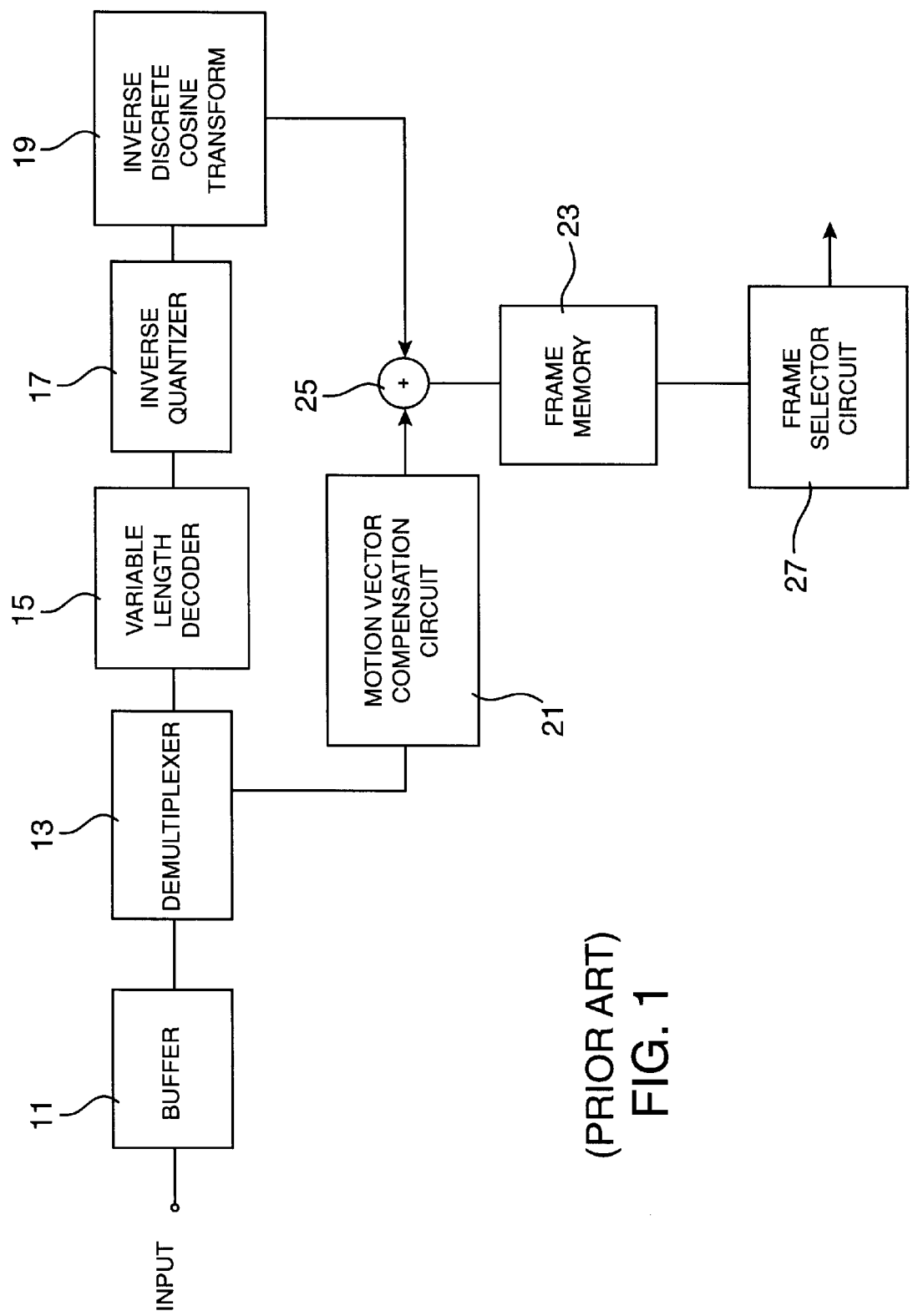
FIG. 1 is a block diagram of a conventional MPEG decoding scheme.
Figure 2A:
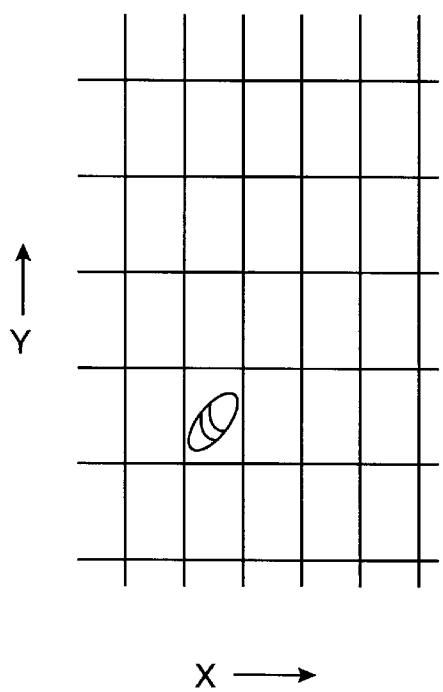
FIGS. 2A and 2B are representations of display portions, illustrating changes and displacement of a displayed object over a time interval.
Figure 2B:
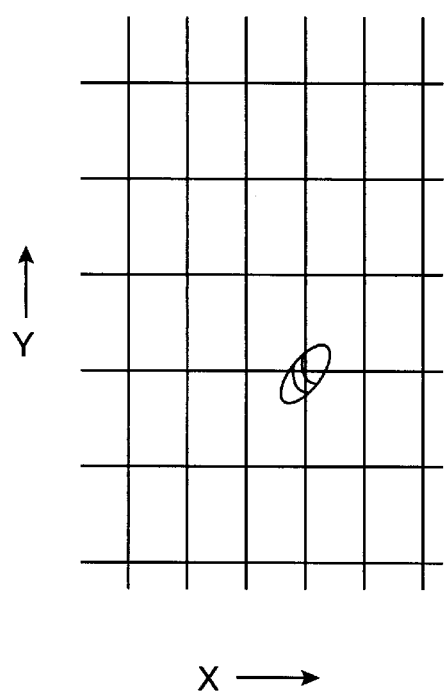

Upon identification of a new block, the block processor accesses the corresponding motion vector from the memory 35. The motion vector is a digital word, the most significant bits of which indicate which block or blocks of data are to be retrieved from the memory to reconstruct the object represented in the current block. The motion vector may indicate a single block if the object is totally within a previously stored block. If the object overlaps a boundary between blocks, such as illustrated in FIG. 2B, the neighboring blocks will be identified by the motion vector.

Figure 4:
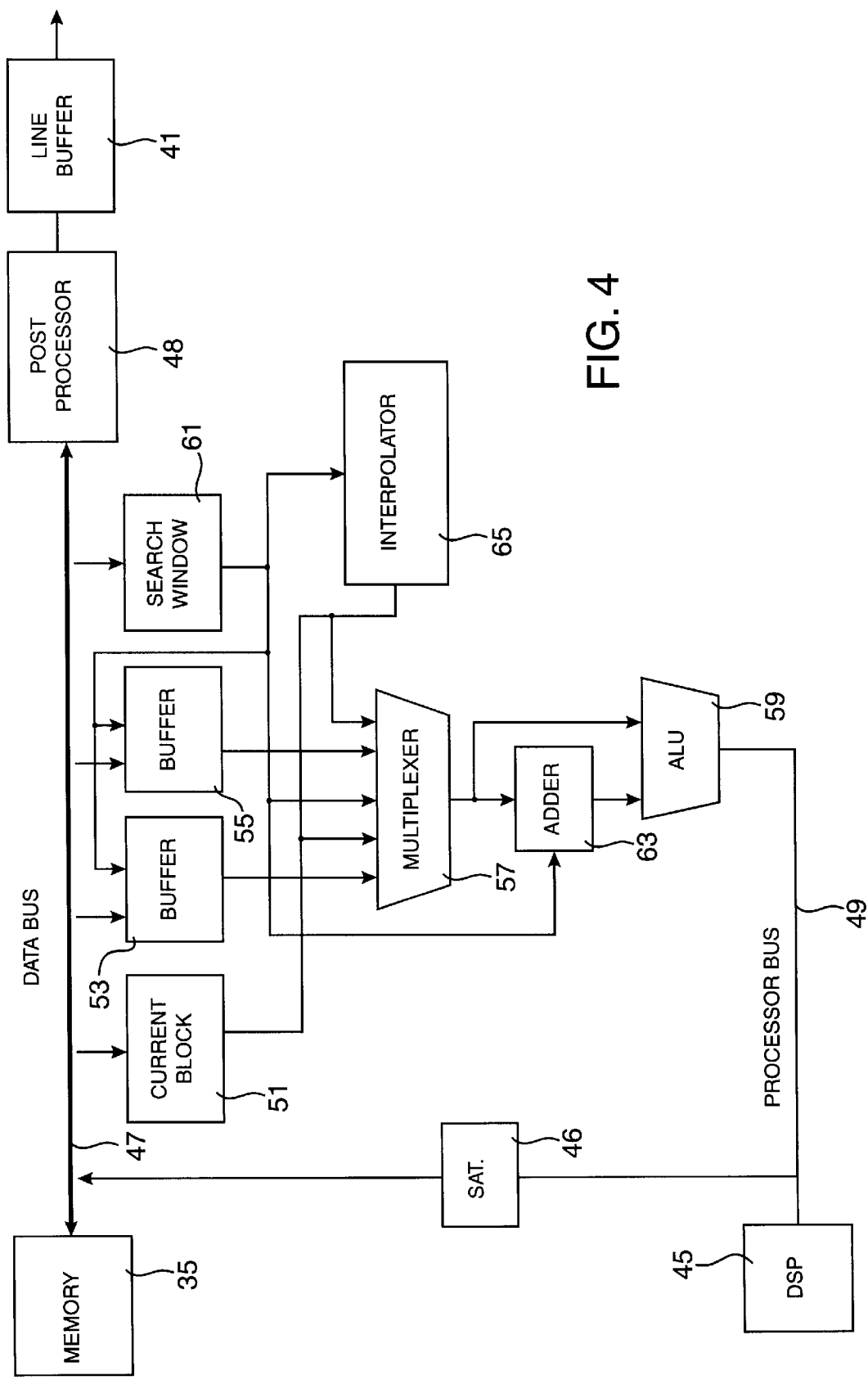
FIG. 4 is a block diagram that depicts elements of the decoding arrangement of the present invention in greater detail.

FIG. 4 is a block diagram that depicts elements of the decoding arrangement in greater detail. Incoming compressed video signals, after going through an error checking and correction process, are supplied to the memory 35 from digital signal processor (DSP) 45 through saturation block 46. The DSP is a conventional processor such as, for example, the AT&T DSP1616. The DSP contains microcode that cooperates with the timing and signals of the raster generator 39 of FIG. 3 for referencing the operation of the processing elements of FIG. 4. Data flow is controlled by the DSP. Data bus 47 directs flow of data among the memory 35, the various buffers and temporary stores of the processing circuit and the output post processor 48. Bus 49 is a processor bus.

At least two image frames of data are stored in memory 35. When an image is to be displayed, some milliseconds later, the image data is accessed from the memory and decompressed "on the fly" to be output through the line buffer for analog television display. Each compressed data block of the frame currently to be displayed is accessed from memory and stored temporarily in current block 51. This block is a buffer that is used to hold the current block in spatial memory during processing. Data can be both read and written from this block to external memory. The desired current block is identified via a current block address register (not shown) that specifies the frame number and the block number. This block data may contain difference and motion vector information relative to previous frames. While stored in the current block, a reiterative decompression process, including inverse discrete transformation transform (IDCT) occurs through the other elements shown in the figure, until the block information is fully decoded and appropriate for output.

Background information in compressed form from previous frames for the current block is accessed from memory and loaded into buffer 53. The background information data blocks are identified for access, under control of the DSP, in accordance with motion vector information in the current block data. IDCT is performed on each block loaded into buffer 53 by repeatedly feeding information through the multiplexer 57, ALU 59 and back through saturation block 46 to the buffer 55. This process continues until one dimensional DCT is obtained in buffer 55. Temporary buffers 53 and 55 are used as temporary storage of data needed for reconstruction of the current block after the DSP identifies and returns the difference block associated with it. A second buffer allows processing a new block of data while processing of data from the current block is ongoing.

Saturation block 46 ensures that the information is limited to eight bits, the final decompressed block being stored in search window block 61. This block data will occupy one quarter of the capacity of the search window storage. Thus, if a block object of the current frame overlaps (at most) the boundaries of four block quadrants of a previous frame, the search window can store decompressed information for all four blocks. As an example, if each block comprises a 16 by 16 bit matrix, the search window has a 32 by 32 bit storage capacity. Each block identified by the motion vector is, in turn, decompressed and stored in the search window.

After the background information has been completely decompressed and stored in the search window, the difference information in the current block is added to the search window information in adder 63 and ALU 59. The image for the current frame has now been recovered and output from the ALU through processor bus and the data bus to post processor 48. The post processor performs filtering, scaling and interpolating functions in accordance with television viewing requirements. For example, the image may be shown as a picture in picture or in a high definition TV that have different scaling requirements.

The current block data at times may require IDCT transformation to decompress motion search information. Although FIG. 4, for simplification of illustration and ease of understanding, does not include an IDCT block for the current block, it is to be understood that a motion search arithmetic unit is included in the circuit of the invention for this purpose.

The interpolator corrects for small motion displacement increments of less than an integer. The output of the interpolator, which represents adjustment of the boundaries of the block object taken from the search window, is applied to the adder through the multiplexer.

Figure 5:
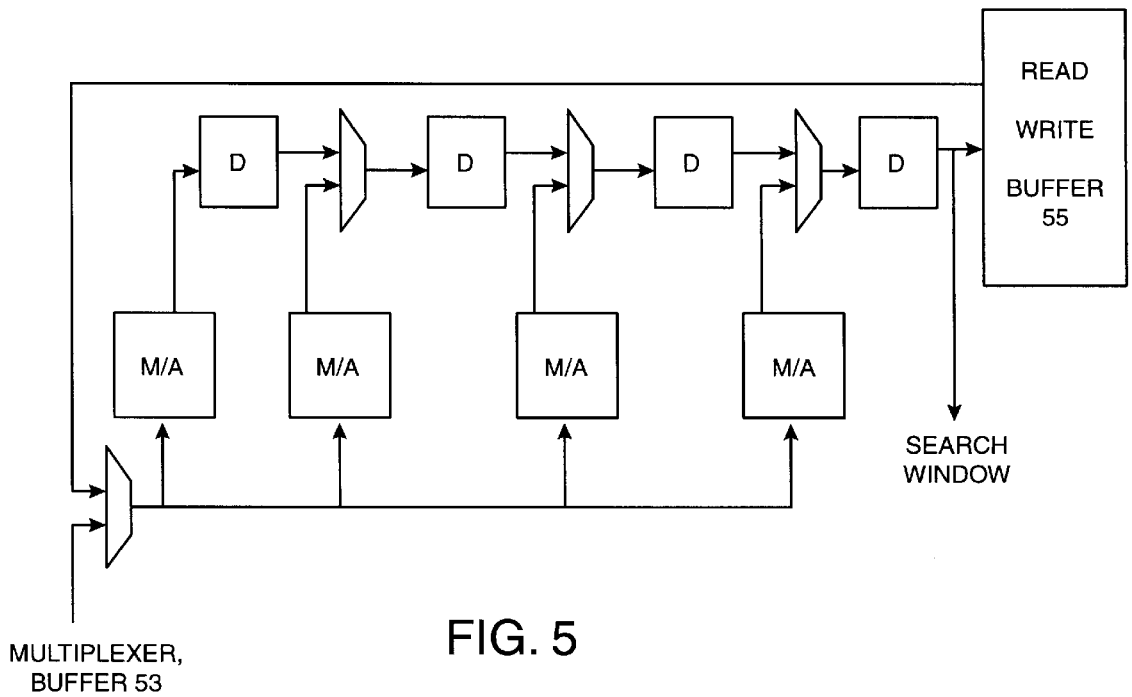
FIG. 5 is a block diagram depicting elements of an arithmetic logic unit used in the decoding arrangement of the present invention.
Figure 6:
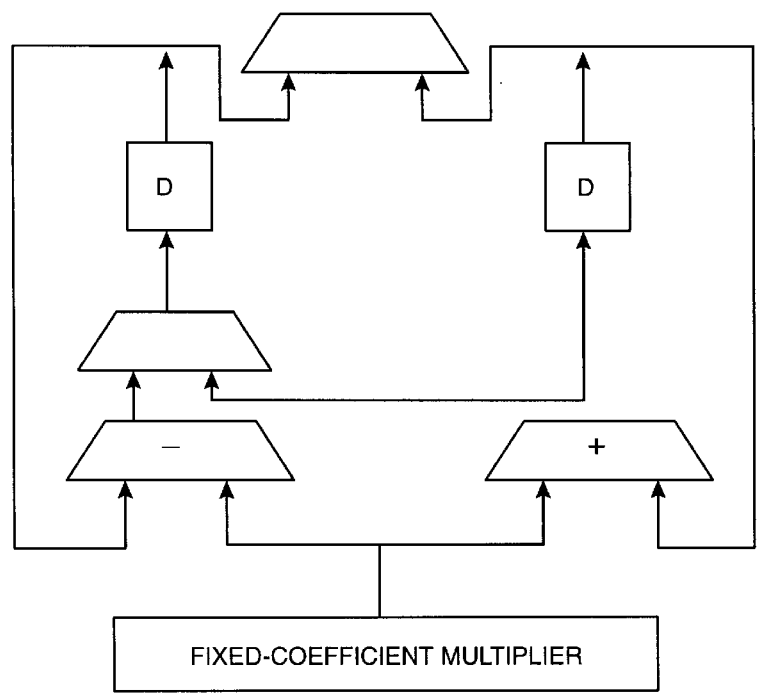
FIG. 6 is a block diagram of a multiplier/accumulator unit used in the arithmetic logic unit of the present invention.

FIG. 5 is a block diagram depicting the elements of ALU 59 wherein data from buffer 53 is processed and returned to buffer 55. Several stages are shown that included data latches D and multiplier/accumulators M/A. Each data latch is an 8 bit flip-flop of conventional construction. The M/A circuit is represented in FIG. 6.

The invention described above offers advantages derived to a great extent from the storage of received signals in memory in compressed form. The memory capacity necessary to decode video signals is considerably reduced. Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein. For example, the decoder is more versatile than conventional devices in that the savings of memory can be used for producing a higher quality graphics. Further, the architecture of this decoder can be used for compression so that a camcorder or VCR may readily be coupled for transmission of video signals as well as reception.

I claim:

1. Apparatus for real time conversion of received coded and compressed digital video motion picture signals to display compatible format signals comprising:

a digital signal processor for receiving compressed video signals representing video display frames;

a memory for storing frames and associated motion vectors of said video signals in compressed form, wherein the motion vectors indicate which block or blocks are to be retrieved from said memory;

block processor decoder means for decoding and decompressing data blocks of the compressed video display frames retrieved from said memory; and post processing means for outputting data received from said block processor decoder means in line by line luma and chroma television format.

2. Apparatus as recited in claim 1, wherein said block processor decoder means comprises:

a plurality of temporary storage means;

a multiplexer connected to receive data from said temporary storage means, and an arithmetic logic unit processor connected to said multiplexer for performing inverse discrete cosine transformation of said data blocks.

3. Apparatus as recited in claim 2, wherein said plurality of temporary storage means comprises:

current block storage means for storing a current data block to be reconstructed, said current data block containing motion vector data relating to at least one block of data from a previous data frame and data for a current frame;

at least one buffer for receiving data identified by said motion vector data and storing data received in reiterative manner from said arithmetic logic unit processor during inverse discrete cosine transformation; and a search window block storage for storing at least one reconstructed data block received from said buffer.

4. Apparatus as recited in claim 3, wherein said arithmetic logic unit processor comprises a plurality of stages, each comprising:

a logic unit having first and second inputs and an output;

multiplier/accumulator means connected to said first input; and a data latch connected to said output.

5. Apparatus as recited in claim 4, wherein said first input is connected to the data latch of a previous stage and said multiplier/accumulator means performs fixed-coefficient multiplication on data received from said multiplexer.

6. Apparatus as recited in claim 3, wherein said post processor means comprises a post processor and a line buffer.

7. In a video signal receiver system including a video display apparatus, a method for real time decoding and decompression of transmitted incoming digital video signals as received comprising the steps of:

storing frames and associated motion vectors of said incoming digital video signals in compressed format in a memory, wherein the motion vectors indicate which block or blocks are to be retrieved from said memory;

accessing from said memory compressed data representing information for a video frame to be currently displayed;

decoding and converting the accessed data to luma and chroma format data compatible with television display; and outputting said luma and chroma format data line by line to said video display apparatus.

8. A method as recited in claim 7, wherein said storing step comprises:

identifying video display frame and block designations of the compressed data contained in said incoming digital video signals; and writing said data in said memory.

9. A method as recited in claim 8, wherein said storing step further comprises checking and correcting for errors in the received digital signals.

10. A method as recited in claim 8, wherein said step of decoding comprises inverse discrete cosine transformation.

11. A method as recited in claim 10, wherein said step of decoding further comprises:

identifying a current data block containing video information to be displayed in a current frame;

storing said current data block in a first temporary buffer;

accessing from said memory a compressed data block from a previous frame that is referenced in said current data block; and storing the accessed data block in a second temporary buffer.

12. A method as recited in claim 11, wherein said inverse discrete transformation comprises:

multiplexing data from said first and second temporary buffers;

applying fixed-coefficient multiplication to the multiplexed data to obtain resultant data; and storing said resultant data in said second temporary buffer.

13. A method as recited in claim 12, wherein said steps of multiplexing, applying and storing are repeated in successive iterations until the data in said second temporary buffer is fully decoded.

14. A method as recited in claim 12, wherein said current data block contains motion vector information identifying a plurality of compressed data blocks of a previous frame that contain data to be referenced in reconstructing the current data block and said step of decoding and converting further comprises:

transferring the fully decoded data of said second temporary buffer to a search window buffer;

storing a second one of said plurality of previous frame data blocks in said second buffer;

applying reiterative inverse discrete cosine transformation on the data in said second buffer until the second data block is fully decoded;

transferring said fully decoded second data block to said search window buffer;

fully decoding any additional ones of said previous frame data blocks and storing the decoded data in said search window buffer; and adding difference information included in said current block data to data accessed from said search window buffer to obtain video output data.

* * * * *